United States Patent
Kawasaki et al.

(10) Patent No.: US 7,548,295 B2
(45) Date of Patent: Jun. 16, 2009

(54) ACTIVE MATRIX SUBSTRATE, LIQUID CRYSTAL DISPLAY DEVICE, AND METHOD OF MANUFACTURING LIQUID CRYSTAL DISPLAY DEVICE

(75) Inventors: Taku Kawasaki, Kanagawa (JP); Shinichi Nishida, Kanagawa (JP); Takayuki Konno, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 283 days.

(21) Appl. No.: 11/723,091

(22) Filed: Mar. 16, 2007

(65) Prior Publication Data

US 2007/0216842 A1 Sep. 20, 2007

(30) Foreign Application Priority Data

Mar. 20, 2006 (JP) ............................. 2006-075954

(51) Int. Cl.
*G02F 1/1343* (2006.01)

(52) U.S. Cl. ............................. 349/141; 349/38; 349/39

(58) Field of Classification Search .................. 349/141
See application file for complete search history.

(56) References Cited

U.S. PATENT DOCUMENTS

| | | | | |
|---|---|---|---|---|
| 6,028,653 A | * | 2/2000 | Nishida | 349/141 |
| 6,784,965 B2 | * | 8/2004 | Kim et al. | 349/141 |
| 7,061,566 B2 | * | 6/2006 | Lee et al. | 349/141 |

FOREIGN PATENT DOCUMENTS

| | | |
|---|---|---|
| JP | 2002-258321 | 9/2002 |
| JP | 2004-213031 | 7/2004 |
| JP | 2005-99855 | 4/2005 |

* cited by examiner

*Primary Examiner*—Richard H Kim
(74) *Attorney, Agent, or Firm*—Young & Thompson

(57) ABSTRACT

A pixel electrode connected to a signal line through a switching element and a common electrode connected to a common wiring are disposed, as alternating with each other, within each pixel region. Common potential lines are disposed on level below the signal line with an insulating film in between and also on both sides of the signal line when seen in plan view. A floating electrode is disposed on level above the signal line with a protective film in between, as overlapping the signal line and the common potential lines on both sides of the signal line.

19 Claims, 6 Drawing Sheets

ACTIVE MATRIX SUBSTRATE, LIQUID CRYSTAL DISPLAY DEVICE, AND METHOD OF MANUFACTURING LIQUID CRYSTAL DISPLAY DEVICE

BACKGROUND OF THE INVENTION

1. Field of the Invention

The present invention relates to an active matrix substrate, a liquid crystal display (LCD) device, and a method of manufacturing the LCD device. Particularly, the present invention relates to an active matrix substrate which forms an LCD device of a horizontal electric field type, the LCD device of the horizontal electric field type, and a method of manufacturing the LCD device of the horizontal electric field type.

2. Description of the Related Art

Recently, an active matrix LCD device using a thin film transistor (hereinafter referred to as a "TFT") as a switching element of a pixel has been widely used as a high-resolution display. The active matrix LCD device is configured mainly of a TFT substrate having an array of the TFTs that act as the switching elements, a counter substrate opposed to the TFT substrate, and a liquid crystal layer sandwiched between the substrates. This LCD device is classified into a vertical electric field type and a horizontal electric field type. The vertical electric field type is designed to rotationally change the direction of directors of oriented liquid crystal molecules in a direction perpendicular to the TFT substrate. The horizontal electric field type is designed to rotationally change the direction of the directors of the oriented liquid crystal molecules in a direction parallel to the TFT substrate. The vertical electric field types include, for example, a twisted nematic (TN) type, and the horizontal electric field types include, for example, an in plane switching (IPS) type.

Each pixel of the LCD device of the horizontal electric field type is provided with a pixel electrode and a common electrode, which are formed on the TFT substrate in parallel and alternate relation, to apply a voltage across the electrodes and thereby generate an electric field parallel to the plane of the substrate. This type of display is designed to apply the electric field parallel to the plane of the substrate, thereby change the direction of the directors of the liquid crystal molecules, and thereby control the amount of transmitted light. The vertical electric field type has a problem that the relation between the amount of transmitted light and the applied voltage, as viewed from the direction of the directors, varies greatly from that as observed from the normal direction to the substrate. In contrast, the horizontal electric field type does not present a problem as is the case with the vertical electric field type because the directors of the liquid crystal molecules rotate in the plane of the substrate. The LCD device of the horizontal electric field type is therefore capable of achieving an image of good quality, as viewed from a very wide viewing angle.

Within each of the pixels of the LCD device of the horizontal electric field type, the liquid crystal layer is driven by being subjected to the electric field originating from the pixel electrode and the common electrode. A signal line receives feed of data written through the switching element to the pixel electrode of each pixel. Alignment defect of the liquid crystal molecules may develop at the edge of the pixel, particularly in the vicinity of the signal line, due to the action of the electric field leaking from the signal line upon the liquid crystal molecules. This involves the occurrence of leakage of light and the like, thus leading to degradation in display quality. The approach of providing a black matrix for light shielding is adopted in order to prevent the degradation in the display quality. Specifically, the black matrix is disposed in a region, facing the edge of the pixel, of the counter substrate opposed to the TFT substrate.

When the width of the black matrix is expanded in a case where the electric field leaking from the signal line has a great influence, the area of a region available for display (namely, an aperture of the pixel), however, decreases correspondingly. Proposed are structures adopted to suppress the electric field leaking from the signal line without having to narrow the aperture of the pixel. However, neither of the structures are satisfactory.

SUMMARY OF THE INVENTION

An exemplary feature of the present invention is therefore to provide an active matrix substrate, an LCD device, and a method of manufacturing the LCD device, which are capable of achieving both an increase in an aperture ratio and an improvement in display quality.

An active matrix substrate according to the present invention includes: plural scan lines and plural common wirings; plural signal lines crossing the plural scan lines and the plural common wirings; and a switching element disposed in each of pixels surrounded by the scan lines and the signal lines. In the active matrix substrate, common potential lines connected to the common wiring are formed on level below the signal line with a first insulating film in between and also on both sides of the signal line as viewed from the normal direction thereto, and a floating electrode is formed on level above the signal line with a second insulating film in between, as overlapping the signal line and at least a portion of each of the common potential lines on both sides of the signal line as viewed from the normal direction thereto.

Preferably, an organic film is formed on the second insulating film, as extending along the signal line and having a greater width than that of the signal line, and the floating electrode is formed as extending along the organic film and having a greater width than that of the organic film.

Preferably, the floating electrode is formed so that each end in a width direction thereof overlaps a portion of each of the common potential lines on both sides of the signal line, as viewed from the normal direction thereto.

Preferably, the floating electrode is formed so that each end in a width direction thereof substantially coincides with corresponding one of the outsides of the common potential lines on both sides of the signal line, as viewed from the normal direction thereto.

Preferably, the floating electrode is formed on the second insulating film.

Preferably, the floating electrodes are formed as isolated from one another for every pixel.

Preferably, the floating electrodes are formed as being continuous with one another to extend across and over plural pixels.

An LCD device according to the present invention includes an active matrix substrate, a counter substrate opposed to the active matrix substrate, and a liquid crystal layer sandwiched between the substrates. In the LCD device, the active matrix substrate includes plural scan lines and plural common wirings; plural signal lines crossing the plural scan lines and the plural common wirings; and a switching element disposed in each of pixels surrounded by the scan lines and the signal lines. In the active matrix substrate, common potential lines connected to the common wiring are formed on level below the signal line with a first insulating film in between and also on both sides of the signal line as viewed from the normal direction to the substrate, and a floating electrode is formed on level above the signal line with a second insulating film in between, as overlapping the signal line and at least a portion of each of the common potential lines on both sides of the signal line as viewed from the normal direction to the substrate.

Preferably, an organic film is formed on the second insulating film, as extending along the signal line and having a greater width than that of the signal line, and the floating electrode is formed as extending along the organic film and having a greater width than that of the organic film.

Preferably, the floating electrode is formed so that each end in a width direction thereof overlaps a portion of each of the common potential lines on both sides of the signal line, as viewed from the normal direction to the substrate.

Preferably, the floating electrode is formed so that each end in a width direction thereof substantially coincides with corresponding one of the outsides of the common potential lines on both sides of the signal line, as viewed from the normal direction to the substrate.

Preferably, the floating electrode is formed on the second insulating film.

Preferably, the floating electrodes are formed as isolated from one another for every pixel.

Preferably, the floating electrodes are formed as being continuous with one another to extend across and over plural pixels.

A method of manufacturing an LCD device according to the present invention includes: a first step of forming plural scan lines and plural common wirings on a substrate and forming a common electrode within a forming region for a pixel, the common electrode being connected to the common wiring; a second step of forming a first insulating film; a third step of forming a semiconductor layer to form a switching element; a fourth step of forming plural signal lines and forming a pixel electrode, the signal lines crossing the scan lines and being each connected to one electrode of the switching element, the pixel electrode being connected to the other electrode of the switching element within each pixel; and a fifth step of forming a second insulating film. In the method, the fourth step follows a step of forming common potential lines, to be connected to the common wiring, on both sides of the signal line as viewed from the normal direction to the substrate, and the fifth step is further followed by a sixth step of forming a floating electrode as overlapping the signal line and at least a portion of each of the common potential lines on both sides of the signal line as viewed from the normal direction to the substrate.

Preferably, a step of forming an organic film, as extending along the signal line and having a greater width than that of the signal line, on the second insulating film is interposed between the fifth and sixth steps in the above mentioned method, and at the sixth step, the floating electrode is formed as extending along the organic film and having a greater width than that of the organic film.

Preferably, at the sixth step, the floating electrode is formed so that each end in a width direction thereof overlaps a portion of each of the common potential lines on both sides of the signal line, as viewed from the normal direction to the substrate.

Preferably, at the sixth step, the floating electrode is formed so that each end in a width direction thereof substantially coincides with corresponding one of the outsides of the common potential lines on both sides of the signal line, as viewed from the normal direction to the substrate.

Preferably, at the sixth step, the floating electrodes are formed as isolated from one another for every pixel.

The active matrix substrate, the LCD device and the method of manufacturing an LCD device according to the present invention have advantageous effects as given below.

A first advantageous effect of the present invention is to increase the aperture ratio of each pixel. The reason is as follows. The common potential lines connected to the common wiring are disposed on the level below the signal line with the insulating film in between and also on both sides of the signal line as viewed from the normal direction to the substrate, and the floating electrode is disposed on the level above the signal line with a protective film in between, as overlapping the signal line and at least a portion of each of the common potential lines as viewed from the normal direction to the substrate. This makes it possible to suppress, with reliability, leakage of an electric field in the vicinity of the signal line. Consequently, this can reduce the width of the common potential line of the active matrix substrate, thus increasing the area of the aperture of the pixel. This also makes it possible to reduce the width of a light shielding black matrix of the counter substrate, thus increasing the area of the aperture of the pixel.

A second advantageous effect of the present invention is to improve the display quality. The reason is as follows. The floating electrode shielding the signal line is not connected to a fixed potential such as a common potential, thereby making it possible to reduce capacitive coupling between the signal line and the common potential lines. It is, therefore, possible to suppress a delay in common potential. Moreover, the protective film on the signal line is thickened, or the organic film is formed on the protective film as extending along the signal line and having a convex shape and a greater width than that of the signal line. This makes it possible to reduce capacitive coupling between the signal line and the floating electrode, thus suppressing the delay in common potential. Furthermore, the floating electrode is formed so as to overlap the common potential lines. This makes it possible to bring the potential of the floating electrode close to the common potential, thus enhancing the effect of shielding a leakage electric field.

Furthermore, the floating electrodes are formed as isolated from one another for every pixel. This makes it possible to reduce the appearance of defects to a minimum. Specifically, a line defect does not appear on the LCD device, and a point defect appears on a single pixel alone, even at the time of the occurrence of a fault such as a short circuit between the floating electrode and the signal line. The reason is that the floating electrode is not connected to any wiring. Although a pixel in the vicinity of a place where a short circuit occurs is affected by the short circuit, pixels adjacent to the affected pixel in the direction from top to bottom of the display are not affected by the short circuit because the floating electrodes are formed as isolated from one another for every pixel.

BRIEF DESCRIPTION OF THE DRAWINGS

These and other objects and advantages and further description of the invention will be more apparent to those skilled in the art by reference to the description, taken in connection with the accompanying drawings, in which.

DETAILED DESCRIPTION OF THE PREFERRED EMBODIMENTS

Figure 7:
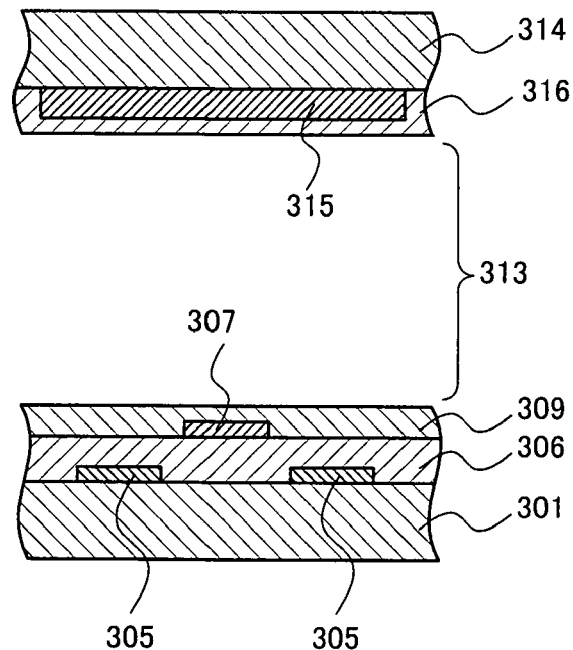
FIG. 7 is a cross-sectional view showing the first conventional structure of an LCD device according to the first related art.

Specific description of related-art LCD devices will be given prior to the description of preferred embodiments of the present invention. When the width of a black matrix is expanded in a case where an electric field leaking from a signal line has a great influence, the area of an aperture of a pixel decreases correspondingly. Various structures adopted to suppress the electric field leaking from the signal line are proposed in order to solve the foregoing problem. Such structures will be described in outline with reference to the drawings. Japanese Laid-Open Patent Nos. 2004-213031 and 2005-99855 present the proposals that common potential lines connected to common wiring are disposed on level below the signal line and also on both sides of the signal line when seen in plane view. FIG. 7 shows the structure, in the vicinity of the signal line, of an LCD device of a horizontal electric field type. An insulating film 306, a signal line 307 and a protective film 309 are formed in turn on top of a glass substrate 301. A pair of common potential lines 305 is formed on level below the signal line 307 and also on both sides thereof when seen in plane view. A black matrix 315 and a color layer 316 are formed on a glass substrate 314. A liquid crystal layer 313 is sandwiched between a pair of the substrates 301 and 314. The related-art LCD device shown in FIG. 7 will be hereinafter called a "first conventional structure."

Figure 8:
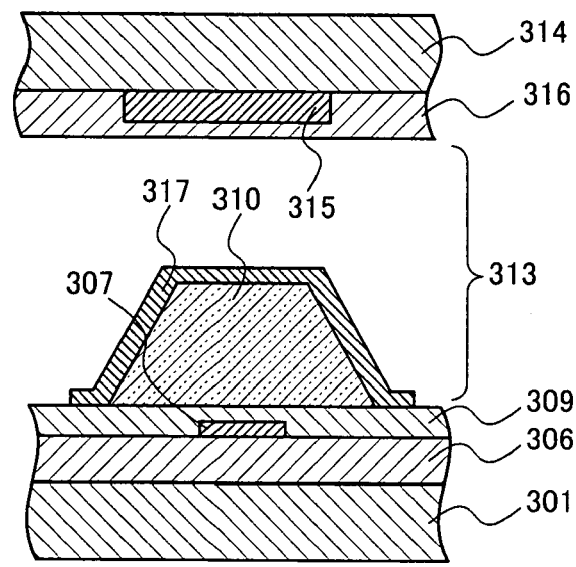
FIG. 8 is a cross-sectional view showing the second conventional structure of an LCD device according to the second related art.

Japanese Laid-Open Patent No. 2002-258321 presents the proposal that a shield electrode connected to the common wiring is disposed over the signal line. FIG. 8 shows the structure, in the vicinity of the signal line, of an LCD device of a horizontal electric field type. An insulating film 306, a signal line 307 and a protective film 309 are formed in turn on top of a glass substrate 301. Moreover, a shield electrode 317 connected to the common wiring (not shown) is disposed over the signal line 307 with an organic film 310 in between. A black matrix 315 and a color layer 316 are formed on a glass substrate 314. A liquid crystal layer 313 is sandwiched between a pair of the substrates 301 and 314. The related-art LCD device shown in FIG. 8 will be hereinafter called a "second conventional structure."

In the first conventional structure in which the common potential lines 305 are disposed on both sides of the signal line 307 when seen in plane view, the top of the signal line 307, however, is adjacent to the liquid crystal layer 313 with the protective film 309 in between. Due to this, the electric field leaking from the signal line 307 spreads out into the liquid crystal layer 313. This involves the common potential line 305 having a greater wiring width, and also inevitably involves the black matrix 315 having a greater width, thus resulting in the problem of having the narrow aperture of the pixel.

In the second conventional structure in which the top layer of signal line 307 is shielded with the shield electrode 317 connected to a common electrode, the signal line 307 is capacitively coupled to the common wiring with the shield electrode 317 in between. Thus, a delay in common potential arises due to parasitic capacitance across the signal line 307 and the common wiring. Moreover, since the shield electrode 317 overlaps the signal line 307, an insufficient potential is fed to the signal line 307 at the occurrence of a short circuit between the signal line 307 and the shield electrode 317. In this case, a line defect may appear and the LCD device should be repaired.

Description will now be given with regard to the preferred embodiments of the present invention. In the preferred embodiments, the present invention is an active matrix LCD device of a horizontal electric field type. The LCD device includes signal lines, scan lines and common wirings extending. The signal lines cross the scan lines and the common wirings. In the LCD device, a pixel electrode connected to the signal line and a common electrode connected to the common wiring are disposed within each pixel, as extending along the signal lines and alternating with each other in a comb shape. In particular, common potential lines connected to the common wiring are disposed on level below the signal line with an insulating film in between and also on both sides of the signal line as viewed from the normal direction to the substrate. Furthermore, a floating electrode is disposed on level above the signal line with a protective film in between, as overlapping the signal line and at least a portion of each of the common potential lines on both sides of the signal line as viewed from the normal direction to the substrate. The protective film on the signal line may be thickened. An organic film formed on the protective film as extending along the signal line and having a convex shape may be subject to patterning to form the floating electrode on the organic film. The floating electrode may be formed so as to overlap the common potential lines on both sides.

This, therefore, can enhance the effect of shielding the signal line, thus reducing the wiring width of the common potential line and the width of the black matrix, thereby increasing an aperture ratio. This can also reduce parasitic capacitance, which is developed between the signal line and the common potential lines capacitively coupled through the floating electrode, to a sufficiently small amount, thus reducing the delay in common potential, thereby suppressing the occurrence of crosstalk. This further can minimize poor display at the occurrence of a short circuit between the signal line and the floating electrode, thereby achieving an improvement in display quality.

First Exemplary Embodiment

For the sake of more detailed description of the embodiments of the present invention, description will be given with reference to FIGS. 1 to 5 with regard to an active matrix substrate, an LCD device, and a method of manufacturing an LCD device according to a first exemplary embodiment of the present invention.

An active matrix LCD device according to the first exemplary embodiment is configured of one substrate having a switching element, such as a TFT, formed thereon (herein referred to as a "TFT substrate"), the other substrate (herein referred to as a "counter substrate"), and a liquid crystal layer sandwiched between the substrates. Incidentally, the description will be given hereinbelow, giving instances where the LCD device according to the first exemplary embodiment is of a horizontal electric field type, and where the TFT is of an inverted-staggered structure. The first exemplary embodiment is that as applied to the LCD device of the horizontal electric field type, which has a configuration in which a pixel electrode and a common electrode are bent within a pixel, and which has the display characteristics of exhibiting minor color tint due to variations in an angle of observation.

Figure 1:
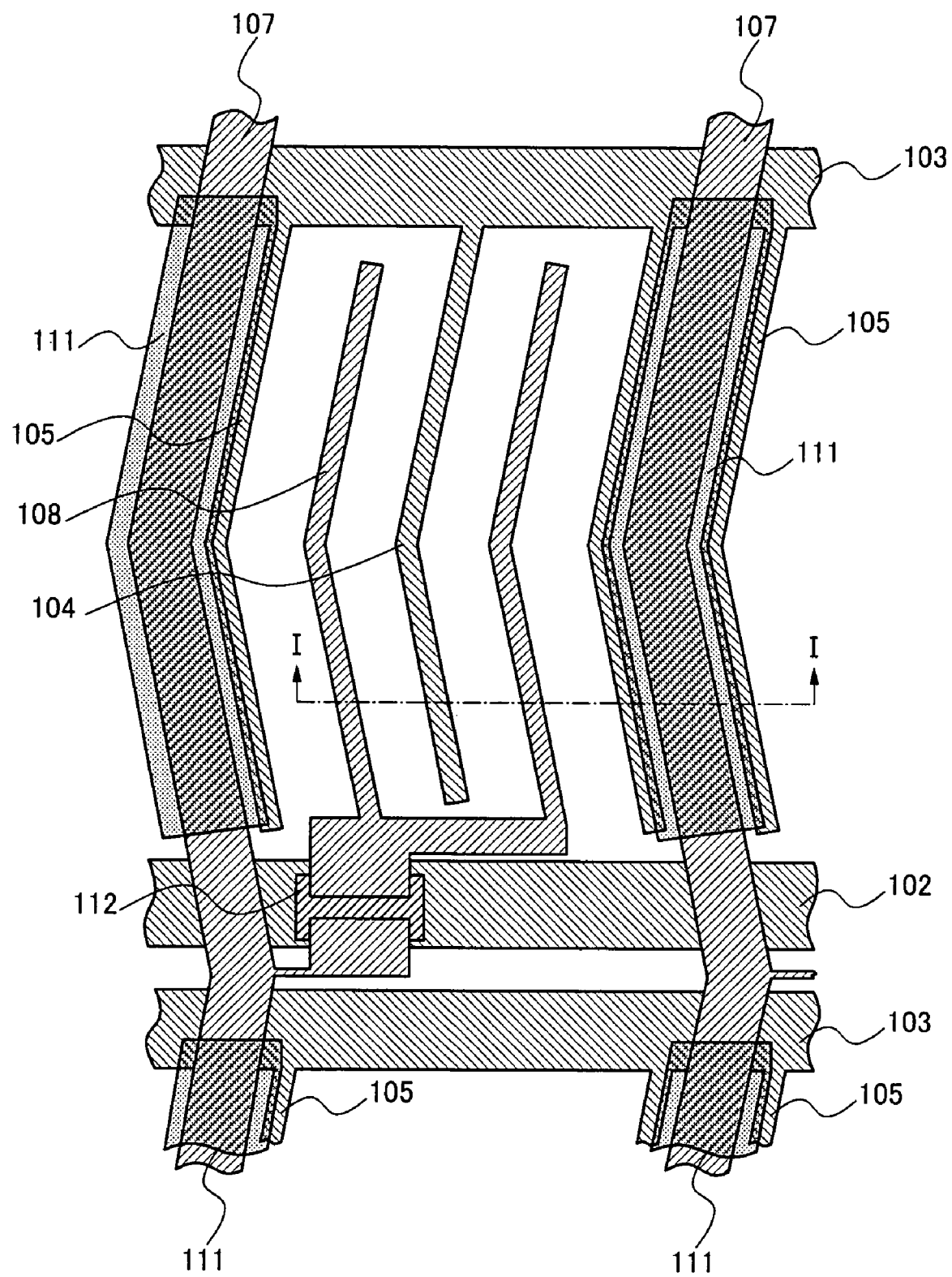
FIG. 1 is a plan view showing the configuration of a TFT substrate according to a first exemplary embodiment of the present invention.
Figure 2:
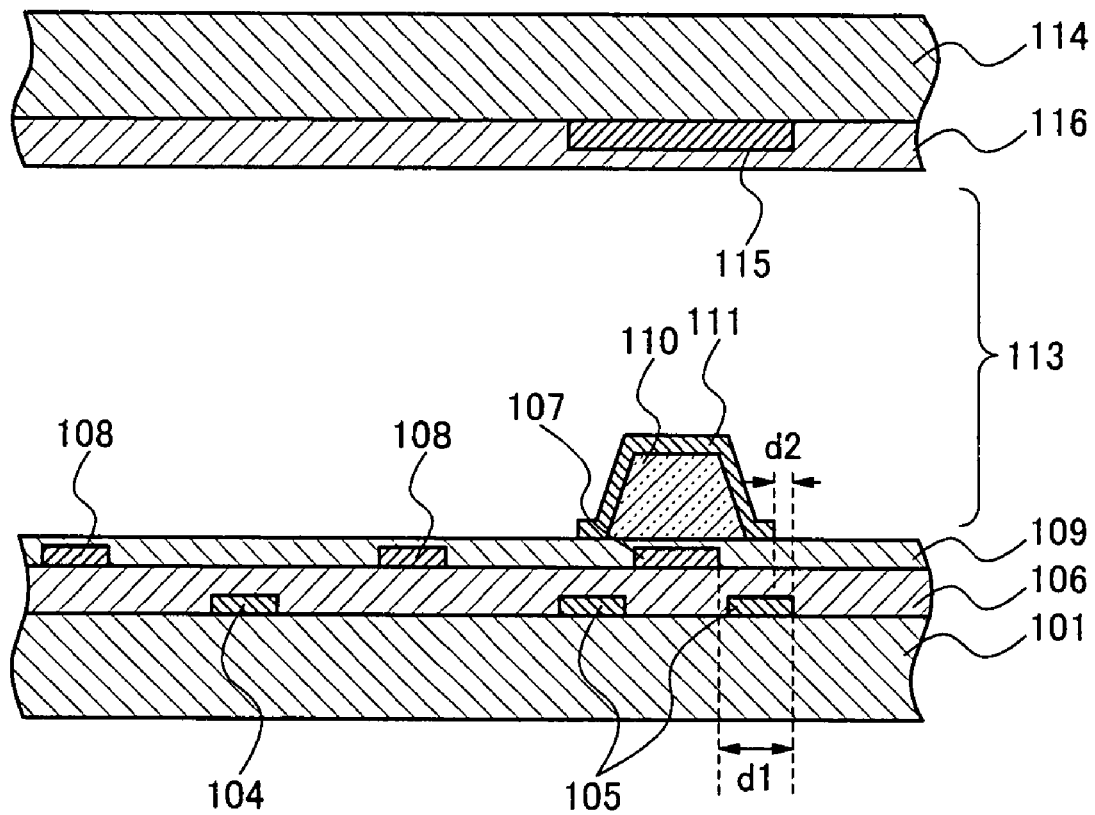
FIG. 2 is a cross-sectional view taken along the line I-I of FIG. 1, showing the configuration of an LCD device according to the first exemplary embodiment of the present invention.

As shown in FIGS. 1 and 2, the TFT substrate according to the first exemplary embodiment includes a glass substrate 101, scan lines (or gate lines) 102, signal lines (or data lines) 107, and common wirings 103. The scan lines 102 and the signal lines 107 are disposed, as crossing each other at a given angle, on top of the glass substrate 101. The common wirings 103 are disposed, as arranged substantially parallel to the scan lines 102, on top of the glass substrate 101. The TFT substrate also includes a TFT 112 disposed in each of pixels surrounded by the scan lines 102 and the signal lines 107. One of source and drain electrodes of each TFT 112 is connected to the signal line 107, and the other thereof is connected to pixel electrodes 108 which is disposed within each pixel and which is extending along the signal lines 107. The common wirings 103 each have a connection to a common electrode 104 disposed within each pixel and extending along the signal lines 107. The pixel electrodes 108 and the common electrode 104 are disposed as alternating with each other, to form a comb shape electrode. The pixel electrodes 108 and the common electrode 104 are bent within each pixel. In each pixel, a liquid crystal layer 113 is driven by the action of a horizontal electric field across the pixel electrodes 108 having a pixel potential fed from the signal line 107 through the TFT 112 and the common electrode 104 having a common potential. Common potential lines 105, the signal lines 107, and floating electrodes 111 are likewise bent within each pixel so as to coincide with a bent form of the pixel electrodes 108 and the common electrode 104.

In the TFT substrate according to the first exemplary embodiment, a pair of the common potential lines 105 connected to the common wiring 103 is disposed on level below the signal line 107 with an insulating film 106 in between and also on both sides of the signal line 107 as viewed from the normal direction to the substrate. The floating electrode 111 is disposed on level above the signal line 107 with a protective film 109 and an organic film 110 in between, as overlapping the signal line 107 and at least a portion of each of the common potential lines 105 on both sides of the signal line 107 as viewed from the normal direction to the substrate. The floating electrodes 111 are formed as isolated from one another for every pixel. In other words, the floating electrodes 111 are formed as divided among the pixels adjacent to one another in the direction from top to bottom of FIG. 1.

As shown in FIG. 2, the counter substrate includes a glass substrate 114, a color layer 116 for displaying RGB (red, green and blue) colors, and a black matrix 115 for shielding unwanted light. The color layer 116 and the black matrix 115 are formed on the glass substrate 114. As for the relative extending directions of the black matrix 115 and the signal line 107, the black matrix 115 is formed with such a width that the black matrix 115 covers the signal line 107 and the common potential lines 105 on both sides of the signal line 107 as viewed from the normal direction to the substrate.

Alignment films (not shown) are formed, respectively, on the surfaces of the TFT substrate and the counter substrate adjacent to the liquid crystal layer 113. The alignment films are subjected to a rubbing process so that the liquid crystal layer 113 is oriented in a direction perpendicular to the longitudinal direction of the scan lines 102. Polarizers (not shown) are disposed in crossed Nicols relation on the outsides of the TFT substrate and the counter substrate. The axis of polarization of one of the polarizers is configured to coincide with an initial orientation of the liquid crystal layer 113.

Figure 3A:
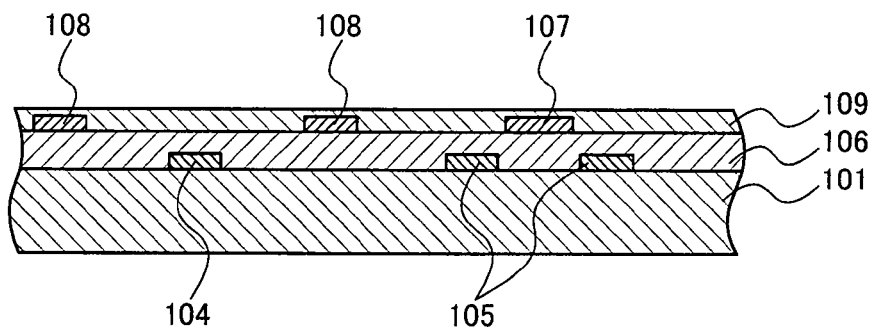
FIGS. 3A to 3C are cross-sectional views for explaining a method of manufacturing an LCD device according to the first exemplary embodiment of the present invention, showing a cross section of the TFT substrate that goes through steps in a manufacturing process.

Description will now be given with reference to FIGS. 3A to 3C with regard to a method of manufacturing the TFT substrate of the above-mentioned configuration. Firstly, as shown in FIG. 3A, metal such as chromium (Cr) is deposited on a transparent insulating substrate made of glass, plastic, or the like (e.g., a glass substrate 101 as employed herein). Scan lines 102, common wirings 103, and a common electrode 104 within each pixel are formed by using known photolithographic and etching techniques. At this process step, a pair of common potential lines 105 to be connected to the common wiring 103 is formed at positions corresponding to both sides of a signal line 107, as viewed from the normal direction to the substrate, to be formed on level above the common potential lines 105 with an insulating film 106 in between. Incidentally, the common potential lines 105 may be formed on the same level as the common wiring 103, or may be formed on level above the common wiring 103 with a given insulating film in between and be then connected to the common wiring 103 through a contact.

The first conventional structure (i.e., the structure shown in FIG. 7) has the problem of decreasing an aperture ratio, because of having to increase the wiring width of a common potential line 305 due to the spread of the electric field leaking from a signal line 307, and inevitably having to expand the width of a black matrix 315. As distinct from this structure, the first exemplary embodiment is configured so that a floating electrode 111 is formed on the level above the signal line 107. Thereby, the first exemplary embodiment makes it possible to suppress the electric field leaking from the signal line 107 and also necessarily narrow the width of a black matrix 115, even when the wiring width of the common potential line 105 is small. Thus, in the first exemplary embodiment, the aperture ratio can be increased. The wiring width of the common potential line 105 may be appropriately designed according to performance required of the LCD device, the film thickness of the insulating film 106, the width of the signal line 107, and so on. However, in the first exemplary embodiment, the wiring width of the common potential line 105 is such that a distance d1 between the edge of the signal line 107 and the edge of the common potential line 105 is about 8 μm as shown in FIG. 2.

Then, the insulating film 106 is formed by depositing silicon oxide ($SiO_x$), silicon nitride ($SiN_x$), or the like by plasma-enhanced CVD (chemical vapor deposition) method or the like. A semiconductor layer made of amorphous silicon (a-Si) or the like is deposited, and subjected to patterning in island shape. Then, the signal line 107 and the pixel electrodes 108 are formed by depositing metal such as chromium (Cr) and patterning the deposited metal. Then, a protective film 109 for protecting a TFT 112 is formed by depositing a $SiN_x$ film or the like by plasma-enhanced CVD method or the like.

Figure 3B:
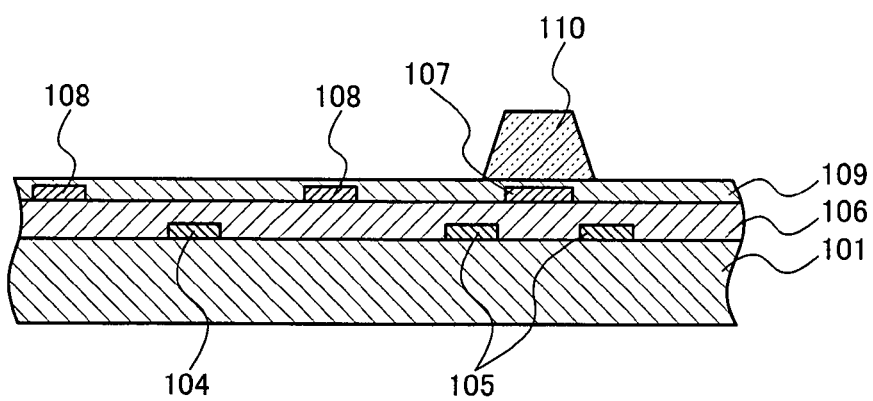

Then, as shown in FIG. 3B, an organic film 110 to form the floating electrode 111, is formed on the protective film 109. The organic film 110 is formed on the protective film 109, as extending along the signal line 107 and having a convex shape and a greater width than the signal line 107. Formation of the organic film 110 of a desired shape can be accomplished for example by applying a coating of a photosensitive acrylic resin or the like by spin coating method, then subjecting the coating to development using an alkaline developing solution, and then curing the coating at a given temperature. It is to be noted at this point that the signal line 107 and the floating electrode 111 in close proximity to each other increase capacitive coupling therebetween. In the first exemplary embodiment, the organic film 110 is therefore configured to entirely cover the signal line 107 and also have a film thickness of about 1.5 μm, thereby ensuring that the signal line 107 and the floating electrode 111 are spaced away from each other.

Figure 3C:
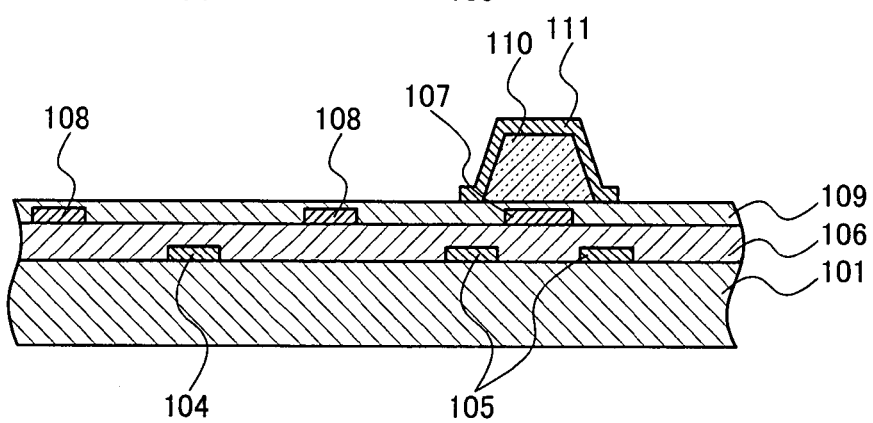

Then, as shown in FIG. 3C, the floating electrode 111 is formed by depositing ITO (Indium Tin Oxide) or the like by use of sputtering method or the like and patterning the deposited film. It is to be noted at this point that a great spacing between the floating electrode 111 and the common potential lines 105 makes it impossible to bring the potential of the floating electrode 111 close to the common potential. In the first exemplary embodiment, the floating electrode 111 is therefore formed so as to extend from the top surface of the organic film 110 to the top surface of the protective film 109 by way of the side surfaces of the organic film 110, and is also configured to cover at least a portion of each of the common potential lines 105 on both sides as viewed from the normal direction to the substrate. Thereby, the first exemplary embodiment brings the potential of the floating electrode 111 close to the common potential, thus enhancing the effect of shielding a leakage electric field. Moreover, in the first exemplary embodiment, the floating electrodes 111 are formed by patterning such that they are isolated from one another for every pixel.

The width of the floating electrode 111 may be appropriately designed according to the performance required of the LCD device, the width of the signal line 107, and so on. In the first exemplary embodiment, the width of the floating electrode 111 is such that an extending distance d2 between the edge of the floating electrode 111 and the edge of the common potential line 105 is about 4 μm as shown in FIG. 2. In the first exemplary embodiment, the floating electrode 111 is made of ITO which is a transparent electroconductive material, in order to prevent the floating electrode 111 from reflecting light. The floating electrode 111, however, may be made of any metallic material, provided that the width of the floating electrode 111 is narrower than that of the black matrix 115. Hereinabove given is an instance where the pixel electrodes 108 are formed on the same level as the signal lines 107. For example, the pixel electrodes 108, however, may be formed at the process step of forming the floating electrode 111 and then connected to one of the source and drain electrodes through a contact hole formed in the TFT 112.

In the TFT substrate manufactured through the process steps mentioned above, the floating electrode 111 shields the electric field leaking from the signal line 107, while being capacitively coupled to the common potential lines 105 on the outside of the organic film 110. In this case, the floating electrode 111 is highly capacitively coupled to the common potential lines 105 on the outside of the organic film 110, but the signal line 107 is less capacitively coupled to the floating electrode 111 on the inside of the organic film 110. This results in reduced capacitance between the signal line 107 and the common potential lines 105.

Since the potential of the floating electrode 111 depends on the capacitive coupling between the signal line 107 and the common potential lines 105, the floating electrode 111 is configured so that the capacitance between the floating electrode 111 and the common potential lines 105 is greater than the capacitance between the floating electrode 111 and the signal line 107. Thereby, the potential of the floating electrode 111 approaches the common potential, so that the effect of the floating electrode 111 on shielding the signal line 107 is closer to be perfect.

The shielding of the leakage electric field reduces alignment defect of liquid crystal molecules resulting from the leakage electric field in the vicinity of the signal line 107, thus eliminating leakage of light in the vicinity of the signal line 107 resulting from the alignment defect. This makes it possible to reduce the, widths of the common potential line 105 and the black matrix 115 for light shielding, thus increasing the aperture ratio.

Figure 4:
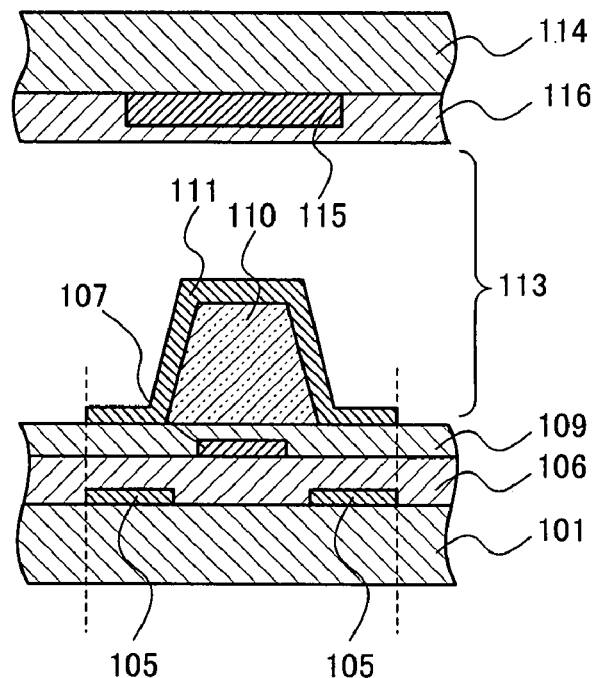
FIG. 4 is a cross-sectional view showing another configuration of the LCD device according to the first exemplary embodiment of the present invention.

In FIG. 2, there is shown an instance where the extending distance d2 between the edge of the floating electrode 111 and the edge of the common potential, line 105 is about 4 μm. According to the present invention, the floating electrode 111 is capacitively coupled to the common potential lines 105 and is thereby subjected to a potential to shield the signal line 107. As shown in FIG. 4, the floating electrode 111, therefore, may completely overlap the common potential lines 105 so that the potential of the floating electrode 111 approaches the common potential, thereby enhancing the effect of shielding the leakage electric field.

Figure 5:
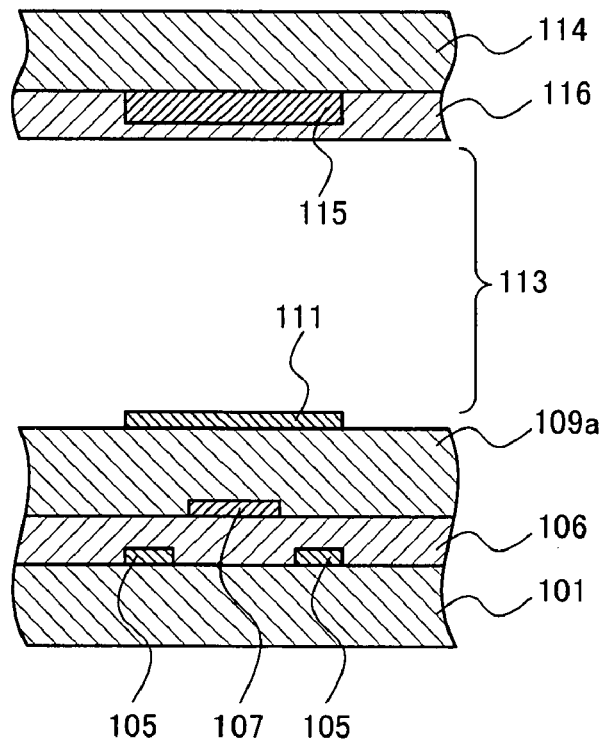
FIG. 5 is a cross-sectional view showing still another configuration of the LCD device according to the first exemplary embodiment of the present invention.

In FIG. 2, there is shown an instance where the organic film 110 is formed on level above the protective film 109 to provide spacing between the signal line 107 and the floating electrode 111. As shown in FIG. 5, the protective film 109 having an increased thickness, rather than the organic film 110, however, maybe provided to reduce the capacitance between the signal line 107 and the floating electrode 111, and thereby avoid a signal delay from occurring. Advantages of this configuration include the maintenance of the alignment of the liquid crystal molecules with ease by rubbing because it is possible to achieve excellent flatness in the vicinity of the signal line 107 due to the absence of the organic film 110, and the reduced number of process steps because of eliminating the need to form the organic film 110.

Although the description has been given with regard to the preferred embodiments, it is to be understood that the present invention is not limited to the above-mentioned active matrix substrate and LCD device, but may be applied to various modifications and forms. FIGS. 1 and 2 are illustrative only, and the configurations, arrangements and shapes of other members may be appropriately designed, provided that there are satisfied relations among the signal line 107, the common potential lines 105 and the floating electrode 111. For example, the numbers of the pixel electrodes 108 and common electrodes 104 may be increased or decreased, although FIG. 1 gives an instance where the comb electrode is formed of one common electrode 104 and two pixel electrodes 108.

Moreover, the pixel electrodes 108 and the common electrode 104 may extend in straight lines, although FIG. 1 illustrates the configuration in which the pixel electrodes 108 and the common electrode 104 are bent within each pixel. Although FIG. 1 illustrates the configuration in which the floating electrodes 111 are formed as isolated from one another for every pixel, the floating electrodes 111 may be formed for example as being isolated from or continuous with one another for plural pixels, in the case of the configuration in which there is a reduced likelihood of a short circuit occurring between the signal line 107 and the floating electrode 111 (e.g., the configuration in which the protective film 109 is thick, etc.).

Second Exemplary Embodiment

Description will be given with reference to FIG. 6 with regard to an active matrix substrate and an LCD device according to a second exemplary embodiment of the present invention, as an example of the modification mentioned above. Omitted is description of the same structural components as those of the active matrix substrate and the LCD device according to the first exemplary embodiment. The second exemplary embodiment is a specific example of a LCD device in which a pixel electrode and a common electrode extend in straight lines, and in which floating electrodes are formed as being continuous with one another for plural pixels.

Figure 6:
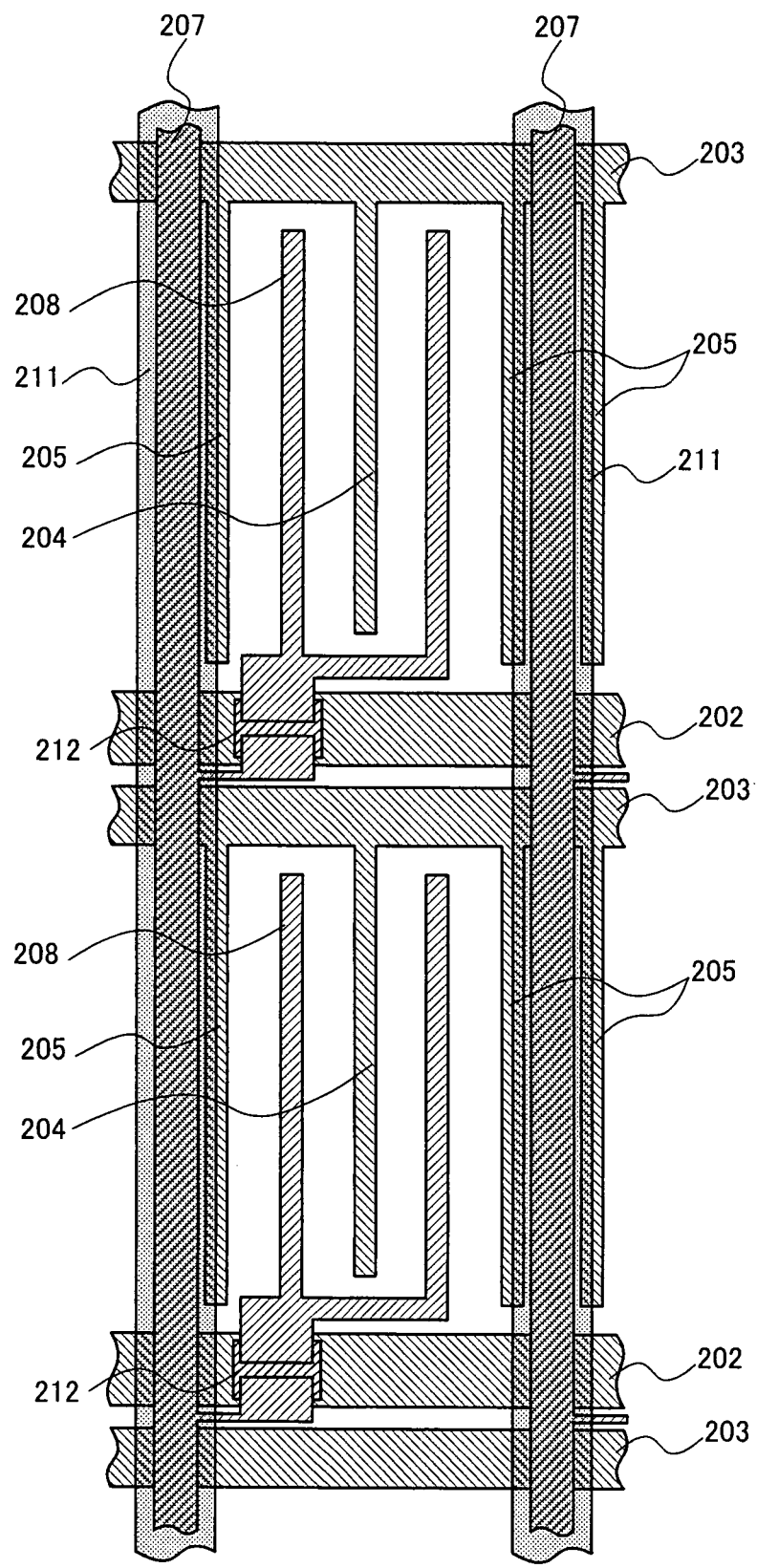
FIG. 6 is a plan view showing the configuration of a TFT substrate according to a second exemplary embodiment of the present invention.

As shown in FIG. 6, a TFT substrate according to the second exemplary embodiment includes a glass substrate, scan lines (or gate lines) 202, signal lines (or data lines) 207, and common wirings 203. The scan lines 202 and the signal lines 207 are disposed, as crossing each other, on top of the glass substrate. The common wirings 203 are disposed, as arranged substantially parallel to the scan lines 202, on top of the glass substrate. The TFT substrate also includes a TFT 212 disposed in each of pixels surrounded by the scan lines 202 and the signal lines 207. One of source and drain electrodes of each TFT 212 is connected to the signal line 207, and the other thereof is connected to pixel electrodes 208 which is disposed within each pixel and which is extending along the signal lines 207. The common wirings 203 each have a connection to a common electrode 204 disposed within each pixel and extending along the signal lines 207. The pixel electrodes 208 and the common electrode 204 are disposed as alternating with each other, to form a comb electrode. The pixel electrodes 208 and the common electrode 204 are not bent but extend in straight lines. In each pixel, a liquid crystal molecule is driven by the action of a horizontal electric field across the pixel electrodes 208 having a pixel potential fed from the signal line 207 through the TFT 212 and the common electrode 204 having a common potential. Common potential lines 205, the signal lines 207, and floating electrodes 211 likewise extend in straight lines within each pixel so as to coincide with the form of the pixel electrodes 208 and the common electrode 204. Since the active matrix substrate shown in FIG. 6 is different from the active matrix substrate shown in FIG. 1 only in that the pixel electrodes, the common electrode, and others extend in straight lines, a cross section of the LCD device using the active matrix substrate shown in FIG. 6 is the same as that shown in FIG. 2. Detailed description of the sectional configuration of the LCD device is therefore omitted.

In the TFT substrate according to the second exemplary embodiment, a pair of the common potential lines 205 connected to the common wiring 203 is disposed on level below the signal line 207 with an insulating film in between and also on both sides of the signal line 207 as viewed from the normal direction to the substrate. The floating electrode 211 is disposed on level above the signal line 207 with a protective film and an organic film in between, as overlapping the signal line 207 and at least a portion of each of the common potential lines 205 on both sides of the signal line 207 as viewed from the normal direction to the substrate. In the second exemplary embodiment, the floating electrodes 211 are formed as being continuous with one another to extend across and over the pixels adjacent to each other in the direction from top to bottom of FIG. 6. In other words, the floating electrodes 211 are formed as linked to each other across the pixels adjacent to each other in the direction from top to bottom of FIG. 6.

The LCD device according to the second exemplary embodiment is provided with a counter substrate, which includes a glass substrate, a color layer, and a black matrix, which are formed on the glass substrate, as in the case of the LCD device according to the first exemplary embodiment. As for the relative extending directions of the black matrix and the signal line, the black matrix is formed with such a width that the black matrix covers the signal line and the common potential lines on both sides of the signal line as viewed from the normal direction to the substrate. The black matrix likewise extends in a straight line so as to coincide with a straight-line form of the signal line and the common potential lines.

Alignment films (not shown) are formed, respectively, on the surfaces of the TFT substrate and the counter substrate adjacent to the liquid crystal layer. The alignment films are subjected to a rubbing process so that the liquid crystal molecule is oriented. Polarizers (not shown) are disposed in crossed Nicols relation on the outsides of the TFT substrate and the counter substrate.

According to the active matrix substrate and the LCD device in accordance with the second exemplary embodiment, the shielding of the leakage electric field reduces alignment defect of liquid crystal molecules resulting from the leakage electric field in the vicinity of the signal line 207, thus eliminating leakage of light in the vicinity of the signal line 207 resulting from the alignment defect, as in the case of the first exemplary embodiment. This makes it possible to reduce the widths of the common potential line 205 and the black matrix for light shielding, thus increasing the aperture ratio. In the case of a configuration in which there is a reduced likelihood of a short circuit occurring between the signal line 207 and the floating electrode 211 (e.g., a configuration in which the protective film is thick, etc.), the floating electrodes may be formed as being continuous with one another for plural pixels, as in the case of the second exemplary embodiment. This enables the aperture ratio to increase, while suppressing the appearance of a line defect.

Although the description has been given with reference to the above exemplary embodiments with regard to the present invention as applied to the LCD device of the horizontal electric field type, it is to be understood that the present invention is not limited to the above exemplary embodiments, but may be applied to an LCD device of a vertical electric field type. Although the description has been given with reference to the above exemplary embodiments with regard to the present invention as applied to the TFT substrate of the inverted-staggered structure, the present invention may be applied to a TFT substrate of a forward-staggered structure. The semiconductor layer of the TFT may be made of polycrystalline silicon rather than amorphous silicon. A thin film diode (TFD) or an MIM (metal insulator metal) element, as well as the TFT, may be used as the switching element. The color layer may be disposed on the active matrix substrate rather than the counter substrate. The color layer may be omitted when the present invention is applied to a monochrome LCD device.

Although the preferred embodiments of the invention has been described with reference to the drawings, it will be obvious to those skilled in the art that various changes or modifications may be made without departing from the true scope of the invention.

What is claimed is:

1. An active matrix substrate comprising:
a plurality of scan lines and a plurality of common wirings;
a plurality of signal lines crossing the plurality of scan lines and the plurality of common wirings; and
a switching element disposed in each of pixels surrounded by the scan lines and the signal lines,
wherein common potential lines connected to the common wiring are formed on level below the signal line with a first insulating film in between and also on both sides of the signal line as viewed from the normal direction thereto, and
a floating electrode is formed on level above the signal line with a second insulating film in between, as overlapping the signal line and at least a portion of each of the common potential lines on both sides of the signal line as viewed from the normal direction thereto.

2. The active matrix substrate according to claim 1, wherein
an organic film is formed on the second insulating film, as extending along the signal line and having a greater width than that of the signal line, and
the floating electrode is formed as extending along the organic film and having a greater width than that of the organic film.

3. The active matrix substrate according to claim 2, wherein the floating electrode is formed so that each end in a width direction thereof overlaps a portion of each of the common potential lines on both sides of the signal line, as viewed from the normal direction thereto.

4. The active matrix substrate according to claim 1, wherein the floating electrode is formed so that each end in a width direction thereof substantially coincides with corresponding one of the outsides of the common potential lines on both sides of the signal line, as viewed from the normal direction thereto.

5. The active matrix substrate according to claim 1, wherein the floating electrode is formed on the second insulating film.

6. The active matrix substrate according to claim 1, wherein the floating electrodes are formed as isolated from one another for every pixel.

7. The active matrix substrate according to claim 1, wherein the floating electrodes are formed as being continuous with one another to extend across and over a plurality of pixels.

8. A liquid crystal display device including an active matrix substrate, a counter substrate opposed to the active matrix substrate, and a liquid crystal layer sandwiched between the substrates,
the active matrix substrate comprising:
a plurality of scan lines and a plurality of common wirings;
a plurality of signal lines crossing the plurality of scan lines and the plurality of common wirings; and
a switching element disposed in each of pixels surrounded by the scan lines and the signal lines,
wherein common potential lines connected to the common wiring are formed on level below the signal line with a first insulating film in between and also on both sides of the signal line as viewed from the normal direction to the substrate, and
a floating electrode is formed on level above the signal line with a second insulating film in between, as overlapping the signal line and at least a portion of each of the common potential lines on both sides of the signal line as viewed from the normal direction to the substrate.

9. The liquid crystal display device according to claim 8, wherein
an organic film is formed on the second insulating film, as extending along the signal line and having a greater width than that of the signal line, and
the floating electrode is formed as extending along the organic film and having a greater width than that of the organic film.

10. The liquid crystal display device according to claim 9, wherein the floating electrode is formed so that each end in a width direction thereof overlaps a portion of each of the common potential lines on both sides of the signal line, as viewed from the normal direction to the substrate.

11. The liquid crystal display device according to claim 8, wherein the floating electrode is formed so that each end in a width direction thereof substantially coincides with corresponding one of the outsides of the common potential lines on both sides of the signal line, as viewed from the normal direction to the substrate.

12. The liquid crystal display device according to claim 8, wherein the floating electrode is formed on the second insulating film.

13. The liquid crystal display device according to claim 8, wherein the floating electrodes are formed as isolated from one another for every pixel.

14. The liquid crystal display device according to claim 8, wherein the floating electrodes are formed as being continuous with one another to extend across and over a plurality of pixels.

15. A method of manufacturing a liquid crystal display device, comprising:
a first step of forming a plurality of scan lines and a plurality of common wirings on a substrate and forming a common electrode within a forming region for a pixel, the common electrode being connected to the common wiring;
a second step of forming a first insulating film;
a third step of forming a semiconductor layer to form a switching element;
a fourth step of forming a plurality of signal lines and forming a pixel electrode, the signal lines crossing the scan lines and being each connected to one electrode of the switching element, the pixel electrode being connected to the other electrode of the switching element within each pixel; and
a fifth step of forming a second insulating film,
wherein the fourth step follows a step of forming common potential lines, to be connected to the common wiring, on both sides of the signal line as viewed from the normal direction to the substrate, and
the fifth step is further followed by a sixth step of forming a floating electrode as overlapping the signal line and at least a portion of each of the common potential lines on both sides of the signal line as viewed from the normal direction to the substrate.

16. The method of manufacturing a liquid crystal display device according to claim 15, wherein a step of forming an organic film, as extending along the signal line and having a greater width than that of the signal line, on the second insulating film is interposed between the fifth and sixth steps, and
at the sixth step, the floating electrode is formed as extending along the organic film and having a greater width than that of the organic film.

17. The method of manufacturing a liquid crystal display device according to claim 15, wherein, at the sixth step, the floating electrode is formed so that each end in a width direction thereof overlaps a portion of each of the common potential lines on both sides of the signal line, as viewed from the normal direction to the substrate.

18. The method of manufacturing a liquid crystal display device according to claim 15, wherein, at the sixth step, the floating electrode is formed so that each end in a width direction thereof substantially coincides with corresponding one of the outsides of the common potential lines on both sides of the signal line, as viewed from the normal direction to the substrate.

19. The method of manufacturing a liquid crystal display device according to claim 15, wherein, at the sixth step, the floating electrodes are formed as isolated from one another for every pixel.

\* \* \* \* \*